Figures 1, 2:
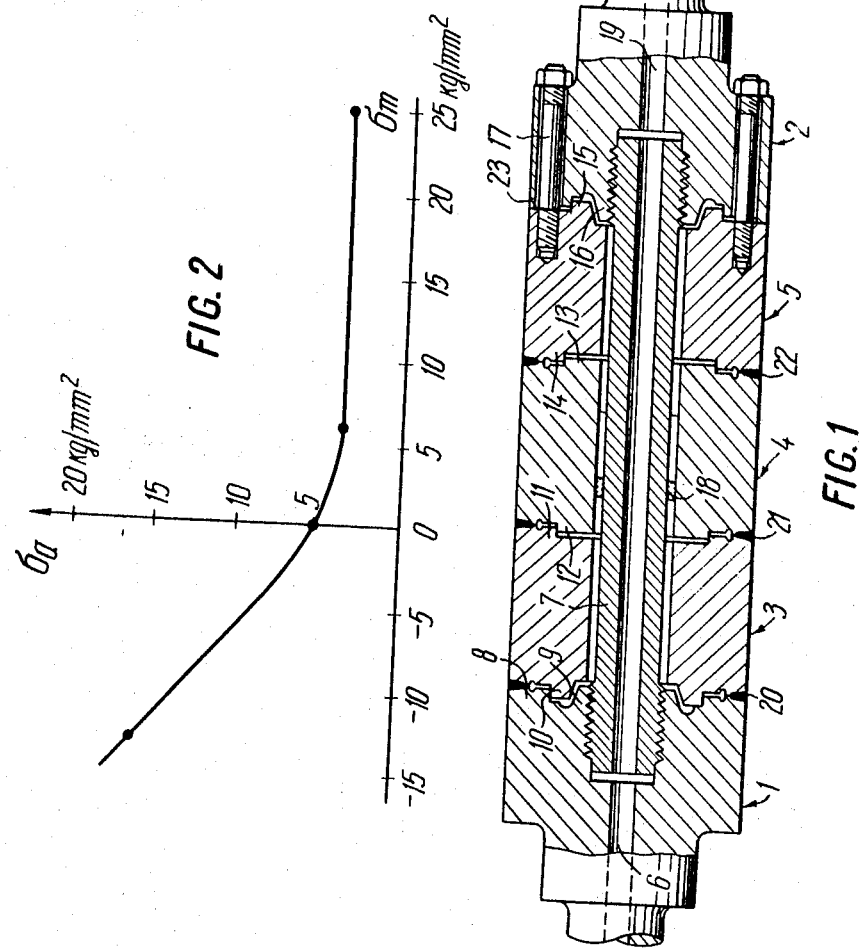

United States Patent [19]
Zorev et al.

[11] 3,780,428
[45] Dec. 25, 1973

[54] METHOD OF MAKING GENERATOR ROTOR OF TURBOGENERATOR UNIT

[76] Inventors: Nikolai Nikolaevich Zorev, ulitsa Novinki, 6, korpus 2, kv. 23; Viktor Vasilievich Chernykh, Belomorskaya ulitsa, 18, korpus 4, kv. 51, both of Moscow; Lazar Yankelevich Stanislavsky, ulitsa Mayakovskogo 11, kv. 24, Kharkov; Mikhail Mikhailovich Timofeev, ulitsa Velozavodskaya 11/1, kv. 323, Moscow; Ivan Vasilievich Kudryavtsev, Sharikopodshipnikovskaya ulitsa, 2, kv. 36, Moscow; Alexei Ilich Isaev, Sharikopodshipnikovskaya ulitsa, 36/8, kv. 300, Moscow; Nikolai Grigorievich Grinchenko, pereulok Vatutina, 16/25; Boris Volkovich Spivak, ulitsa Kossiora 56, kv. 55, both of Kharkov; Vladimir Alexandrovich Belov, Leningradskoi oblasti ulitsa Very Slutskoi, 9, kv. 32, Kolpino; Adolf Efimovich Kozik, Leningradskoi oblasti ulitsa Very Slutskoi 11, kv. 20, Kolpino; Adolf Ivanovich Shavrin, Leningradskoi oblasti prospekt Lenina, 45, kv. 17, Kolpino; Jury Vasilievich Sobolev, Leningradskoi oblasti ulitsa Novgorodskaya 16, korpus 2. kv. 13, Kolpino, all of U.S.S.R.

[22] Filed: Nov. 3, 1970
[21] Appl. No.: 86,564

[30] Foreign Application Priority Data
Oct. 31, 1969 U.S.S.R. .......................... 1368152
Oct. 31, 1969 U.S.S.R. .......................... 1368153

[52] U.S. Cl. .................. 29/598, 310/42, 310/216, 310/261
[51] Int. Cl. .......................................... H02k 15/02
[58] Field of Search ............... 29/596, 598; 310/42, 310/216, 217, 261

[56] References Cited
UNITED STATES PATENTS
2,103,795  12/1937  Rose ................................ 29/598 X
3,304,358  2/1967  DeJean et al. .................... 29/598 X

*Primary Examiner*—Charles W. Lanham
*Assistant Examiner*—Carl E. Hall
*Attorney*—Waters, Roditi, Schwartz & Nissen

[57] ABSTRACT

The invention relates to a method of making the generator rotor of a large-sized turbogenerator unit, said rotor comprising two end members and a few annular intermediate members welded together and to the guide member.

According to the invention some favourable compressive stresses are developed in the welded joints by means of the embracing stem fixed in position to the end members, said stresses adding much to the fatigue strength of said welded joints.

The welded and mechanical joints of the rotor, as well as the embracing stem are so designed that in the case of failure of one of the said joints the breakdown of the rotor is precluded.

4 Claims, 2 Drawing Figures

PATENTED DEC 25 1973 3,780,428

METHOD OF MAKING GENERATOR ROTOR OF TURBOGENERATOR UNIT

The present invention relates to a method of making the generator rotor for a turbogenerator unit. The method has its greatest utility when employed in the making of the rotor of a four-pole generator for generating power of over 1,000 MW whose size is so large that it is difficult, if not completely impossible, to make from a solid forging.

The generator rotor is commonly made of a number of separate forgings which, after having been machined, are joined together either mechanically or by welding.

For example, known in the art is a method of making the turbogenerator rotor from two end members and a number of annular-shaped intermediate members which are braced or fastened together by means of a threaded central rod or stem screwed into the end members (cf., e.g., German Pat. No. 567854 and GFR Pat. No. 827094).

However, the rotor of a generator for a power in excess of 1,000 MW made by such a method, possesses only limited strength, rigidity and reliability. The reduced strength of such a rotor results chiefly from the fact that torque is taken by only the friction forces arising between the butt ends of the joined members. The reduced reliability stems from the fact that all the rotor members are held together by the central threaded stem only, which has a cross-sectional area 10–15 times smaller than the middle portion of the rotor. The reduced bending rigidity of the rotor is due to a higher contact strain arising at the butt joints of the rotor members.

Also known is a method for the partial elimination of only one of the above-mentioned difficulties, said method residing in an additional interconnection of the rotor members through keys and studs, whereby the rotor strength becomes somewhat higher.

Occasionally, use is made of a plurality of stems or rods, instead of a single one, for bracing or fastening the rotor members together, which are spaced along the rotor periphery (cf., e.g., GFR Pat. No. 827094). However, this method is inapplicable in making large-sized two- and four-pole rotors since the size and quantity of stems used are limited to the rotor winding slots. Another currently method used for making generator rotors has the rotor made from a plurality of members which are welded together (cf., e.g., Swiss Pats. Nos. 150099 and 32054). However, as investigations have shown, the fatigue strength (or endurance limit) of welded joints used for high-power generators is rather low since considerable cyclic bending stresses are liable to arise with increases in the rotor size.

It is therefore a general object of the present invention to obviate difficulties which may arise in presently used methods when making the rotors of high-power generators.

It is a specific object of the present invention to provide a method for making the generator rotor comprising two end members and a plurality of intermediate members braced together by a stem or rod, which makes provisio for said members to be welded together and is instrumental in establishing a stressed state in all welded joints to thereby increase the rotor fatigue strength.

According to the invention, the foregoing object is attained in that prior to bracing or fastening the rotor members, the end member which serves as a guide with respect to the other members, is weld-joined with at least one of the intermediate members, and subsequent bracing or forcing of the rotor members together is effected by applying a force which exceeds the total tensile stress arising in the regions or zones of the welded connections caused by thermoplastic deformation and structural changes during welding and heat treatment stages of the rotor manufacturing process, and from the bending of the rotor when the latter is rotated during operation.

In this case the fatigue strength of the rotor welded joints is at least doubled. It is expedient that the rotor members are fastened or braced together by establishing a temperature differential between the fastening stem or rod and the rotor members being fastened together, and wherein the ends of the fastening stem are fixed relative to the rotor end members.

The rotor members which not welded together are preferably interconnected by any conventional mechanical joints or fastener devices.

Reference may now be had to a detailed description of a specific and preferred embodiment of the method thereof in conjunction with the accompanying drawings, wherein:

FIG. 1 is a longitudinal sectional view of a rotor made in accordance with the method of the present invention; and FIG. 2 is a graphic representation of ultimate fatigue strength vs mean stresses in a welded joint of the rotor.

As stated hereinbefore the method of the invention provides for making a rotor, comprising two end members 1 and 2 (FIG. 1), the former being a guide one, and a number of annular-shaped intermediate members 3, 4 and 5. Provision is made in the end members 1 and 2 for threaded apertures 9 and 16 adapted to be joined with the threaded ends of a hollow cylindrical bracing stem or rod 7 onto which are fitted the annular-shaped intermediate members 3, 4 and 5. Alignment of the end and intermediate members with respect to each other during assembly is attained due to the provision of circular ridges or claws 10, 12, 13 and 15 made on the respective intermediate members 3, 4 and 5. The claws engage the respective circular recesses or nest within the adjacent members. For centering the middle portion of the bracing stem provision is made for an elastic sleeve 18 having a through lengthwise groove and accommodated in the hole of the intermediate member 4. Once all the members have been fitted over the stem 7, the members 1, 3, 4 and 5 are preheated and welded together. After having been heat treated by a conventional technique, welded joints 20, 21 and 22 are subjected to compression. To this effect hot gas or steam is fed through the hole 6 so as to pass through the bore of the bracing stem 7 and permitted to escape therefrom through a hole 19 in the end member 2. Upon obtaining a predetermined temperature differential between the stem 7 and the intermediate members 3–5 of the magnitude of 200°–300° C, the end member 2 is threaded onto the stem 7 as far as possible and the gas or steam feed is stopped. The threading action of the end member 2, in which the latter is effectively a nut having internal thread 9 in engagement with the externally threaded end portion of stem 7, generates a compressive forces or stresses in the rotor after cooling thereof. As a result compressive stresses $\sigma_m = 10$ kg/mm$^2$ minimum can be established in the welded joints after these have been air-cooled, this increasing ultimate fatigue strength $\sigma_a$ of a welded joint to at least twice normal values, as is evidenced by the chart in FIG. 2.

Upon having been cooled down, the intermediate member 5 and the end member 2 are interconnected through studs 23 or by any other conventional mechanical joint or association whose strength is sufficiently high to sustain relatively low short-time loads which would be imposed upon the extreme rotor members in the event of fracture of the central bracing stem 7. Subsequently, winding slots are formed in the rotor.

As compared to known rotors which are made by welding, the rotor made to in accordance with the method disclosed in the present invention, advantageously has the fatigue strength of the rotor welded joints increased to such an extent whereby their failure under the effect of cyclic bending during prolonged service of the rotor is rendered practically impossible. Additionally, any harmful effect resulting from possible welding defects is drastically decreased since the effective tensile stresses which contribute to the rapid development of such defects are counteracted by the preformed compression stresses.

Moreover, the rotor reliability is enhanced to such a degree that the generator failure is precluded even in the unlikely event of fracture of the welded joints due to welding defects, since short-time operability of the rotor is ensured by the bracing stem.

in comparison with rotors whose members are interconnected through mechanical means, the rotor of the invention has a higher degree of rigidity due to the fact that all the members thereof which take maximum loads are strongly interconnected by welding; a higher twisting and bending strength since welded joints provide a much higher shearing resistance than mechanical joints; a higher rotor operation reliability in the event of the bracing stem being fractured, a short-time rotor operability being ensured by the welded joint therein; and a higher operation stability inasmuch as the relaxation of the force affecting the rotor members resulting from contact deformations is largely diminished due to the provision of welded joints therein.

We claim:

1. A method of making the generator rotor of a turbogenerator unit, said rotor comprising two end members and a plurality of intermediate members having holes, said method comprising passing a bracing stem through said holes in said members, connecting one of said end members to said bracing stem, welding one of said end members forming a guide member with respect to the other ones to at least one of said intermediate members, and subsequently bracing all said members by applying a force exceeding the total stresses generated in welded joints between said members due to thermoplastic deformations and structural changes during welding and heat treatment during the manufacturing process of said rotor and from any rotor bending during rotation, and adapting said rotor for arranging windings therein.

2. A method as claimed in claim 1, wherein said bracing operation of said rotor members is carried out at a temperature differential between said stem and said members so as to form in said welded joints compressive stresses which exceed the total tensile stresses generated in said joints due to thermoplastic deformations and structural changes during welding and heat treatment during the rotor manufacturing process and from the rotor bending while it rotates during operation.

3. A method as claimed in claim 1, wherein those rotor members that are not welded together, are mechanically interconnected.

4. A method as claimed in claim 2, wherein those rotor members that are not welded together, are mechanically interconnected.

* * * * *